United States Patent [19]

Thurow

[11] Patent Number: 4,657,229

[45] Date of Patent: Apr. 14, 1987

[54] PNEUMATIC SHOCK ABSORBER WITH ROLLING BELLOWS

[75] Inventor: Gerhard Thurow, Garbsen, Fed. Rep. of Germany

[73] Assignee: Continental Gummi-Werke Aktiengesellschaft, Hanover, Fed. Rep. of Germany

[21] Appl. No.: 684,486

[22] Filed: Dec. 21, 1984

[30] Foreign Application Priority Data

Dec. 21, 1983 [DE] Fed. Rep. of Germany ....... 3346108

[51] Int. Cl.$^4$ .................. B60G 11/26; F16F 9/04
[52] U.S. Cl. ................. 267/64.27; 267/122; 403/134
[58] Field of Search ............ 267/64.24, 122, 64.19, 267/64.21, 64.27, 35; 285/242, 252, 253, 256, 259; 403/373, 134, 288, 291; 92/98 D

[56] References Cited

U.S. PATENT DOCUMENTS

| | | | |
|---|---|---|---|
| 3,022,152 | 3/1962 | Deschner | 267/64.24 X |
| 3,130,965 | 4/1964 | Niclas | 267/64.27 |
| 3,819,166 | 6/1974 | Ellis et al. | 267/64.21 |
| 3,850,437 | 11/1974 | Owen | 267/64.21 X |
| 3,897,941 | 8/1975 | Hirtreiter et al. | 267/64.24 |
| 4,378,935 | 4/1983 | Brown et al. | 267/64.27 |
| 4,398,704 | 8/1983 | Buchanan et al. | 267/64.21 |

FOREIGN PATENT DOCUMENTS

| | | | |
|---|---|---|---|
| 2515295 | 4/1983 | France | 267/122 |
| 6502673 | 9/1965 | Netherlands | 188/64.27 |

Primary Examiner—Douglas C. Butler
Attorney, Agent, or Firm—Becker & Becker, Inc.

[57] ABSTRACT

A pneumatic shock absorber, especially for road vehicles. The rolling bellows of the shock absorber is made of a simple hose body which has no end beads, and is mounted with the aid of metal clamping rings on vehicle parts which are cushioned relative to one another. To simplify mounting, the mounting regions of these parts are provided with reduced-diameter engagement surfaces. To improve this mounting system, the support piston which is associated with the lower end portion of the rolling bellows is provided with circumferential ribs which are disposed in at least one axial portion of the reduced-diameter mounting region thereof. These circumferential ribs preferably have a triangular cross-sectional shape. The frictional mounting is thus supplemented and reinforced in a simple manner by a positive connection, so that the rolling bellows is reliably secured relative to every disadvantageous axial movement.

1 Claim, 2 Drawing Figures

PNEUMATIC SHOCK ABSORBER WITH ROLLING BELLOWS

BACKGROUND OF THE INVENTION

1. Field of the Invention

The present invention relates to a pneumatic shock absorber, especially for road vehicles, and comprises a rolling bellows which is made of rubber or rubber-like synthetic materials having reinforcing elements therein; the end portions of the bellows are mounted on support elements by means of metal clamping rings. Also provided is a support piston which has a surface on which the rolling fold associated with the bottom end portion of the bellows can ride; in the mounting region, the support piston has a cylindrical reduced diameter portion with a flange-like delimiting end abutment surface.

2. Description of the Prior Art

The direct result of this unique construction of the support piston in the mounting region of the rolling bellows is the possibility of placing the clamping ring which encircles the end of the bellows in contact with the flange-like delimiting abutment surface, and integrating this clamping ring into the operative region of the bellows as an extension of the surface on which the rolling fold rides. In contrast to other heretofore known means for mounting the bellows, there results a longer cushioning stroke without encountering the otherwise unavoidable and disruptive gap in the transition zone. Thus, the end effect is an improved cushioning characteristic of the rolling bellows. However, in the practical application of this mounting system there is encountered the drawback that the rolling bellows, which is made as a simple hollow cylindrical hose member which has no end beads, and the smooth-walled ends of which are only frictionally clamped, has the constantly occurring tendency under the changing stresses encountered when driving to gradually pull out of the mounting support, which always implies complete failure of the cushioning effect.

An object of the present invention is to reliably preclude this hazzard without the necessity of having to modify the bellows.

BRIEF DESCRIPTION OF THE DRAWING

This object, and other objects and advantages of the present invention, will appear more clearly from the following specification in conjunction with the exemplary embodiment which is schematically illustrated in the drawing, in which.

SUMMARY OF THE INVENTION

Figure 1:
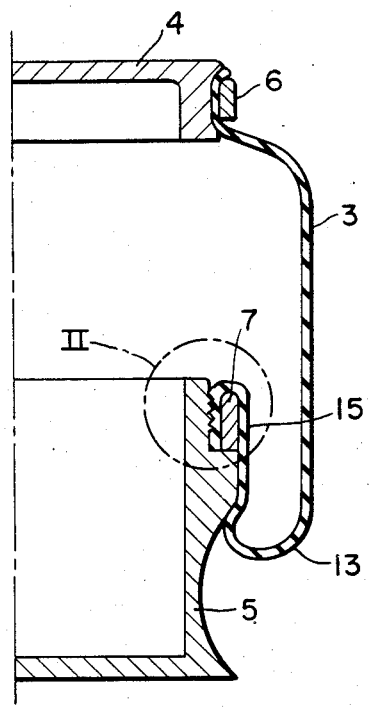
FIG. 1 is a longitudinal sectional view taken through one half of a compressed-air rolling bellows in the installed state.

The pneumatic shock absorber of the present invention is characterized primarily in that the support piston, which is associated with the lower end portion of the rolling bellows, is provided in its reduced diameter mounting region with circumferential ribs which are disposed in diametrical planes; the circumferential ribs have a cross-sectional shape which is angularly symmetrical. This symmetrical, cross-sectional shape is preferably formed by an equilateral or isosceles triangle, with the outer triangle angle of the rib cross-section expediently approximately 90°. Pursuant to a specific feature of the present invention, there is recommended that the circumferential ribs only be provided in one axial portion of the mounting region, and in particular preferably in a central zone of this region which is bounded on both sides by smooth cylindrical zones.

With relatively simple structural means, the present invention leads to a considerable improvement of the effectiveness of the heretofore known pneumatic shock absorbers which utilize rolling bellows. The angular circumferential ribs, which are machined in during the course of the mechanical machining of the support piston which is necessary in any case, and which project beyond the smooth-cylindrical adjacent regions, penetrate the elastically resilient bellows walls under the influence of the radially inwardly directed clamping force of the clamping ring, so that the otherwise only frictionally effective clamping is additionally supplemented and reinforced by a positive connection, and is hence securely held relative to every axial movement. The inventive mounting of the bellows thus produces the desired operational reliability, and improved utility and durability, without at the same time having to put up with a more difficult installation or removal of the rolling bellows.

DESCRIPTION OF PREFERRED EMBODIMENTS

Referring now to the drawing in detail, the illustrated rolling bellows 3 is in the form of a smooth-cylindrical hose body, which is made, for example, of synthetic rubber having non-illustrated textile reinforcing elements, and which is made without beads or other enlarged end portions, so that it has a uniform thickness over its entire length. The rolling bellows 3 serves for cushioning or shock absorption of the chassis of a road vehicle relative to the wheel axle. For this purpose, the upper end portion of the bellows 3 is mounted to a top member 4 which is connected to the chassis, and the lower end portion of the bellows 3 is mounted on a support piston 5 which rests on the axle. Under the effect of the air pressure which is built up within the bellows 3, the latter assumes the illustrated configuration with the aid of a rolling fold or curvature 13 which leads to the lower end portion. The support piston 5, in turn, has peripheral portions at its mounting region which for the rolling fold 13 of the bellows 3 offer surfaces on which the rolling fold can rest and ride. The support piston 5 is in constant communication with the interior of the bellows 3, and serves at the same time as an additional receptacle for air. By means of closed, metal clamping rings 6, 7, both end portions of the rolling bellows 3 are mounted on the associated support parts 4, 5.

At its upper, open end, the support piston 5 has an outer periphery which is cylindrically reduced in such a way that, as shown in FIG. 1, it receives the placed-upon end portion of the rolling bellows 3 together with the clamping ring 7 to completely restore its original diameter. The clamping ring 7 sits on an annular end abutment surface 15 which is angled-off in the manner of a flange. The clamping ring 7 consequently forms an extension of the outer surface of the support piston, adjoining the latter in such a way that no gap is formed.

Figure 2:
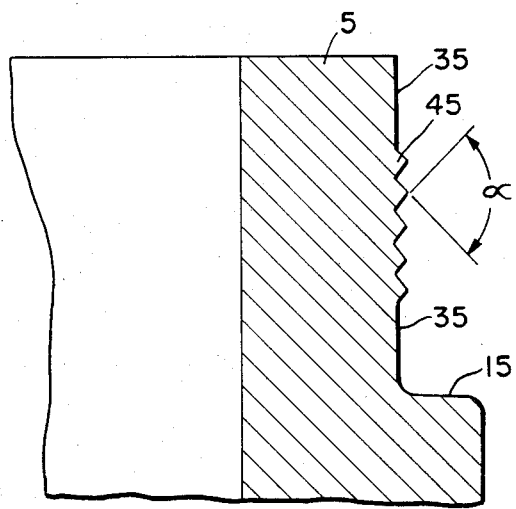
FIG. 2 is an enlarged detail view of that portion of the support piston of FIG. 1 which is encircled by a dot dash line and is indicated by II.

As shown in FIG. 2, the middle portion of the reduced-diameter mounting region of the support piston 5 is provided with a plurality, five in the illustrated embodiment, circumferential ribs 45. The cross-sectional shape of the circumferential ribs 45 is that of an equilateral or isosceles triangle, with the outer angle $\alpha$ being approximately 90°. The bases of these circumferential ribs 45, which bases are opposite the angle $\alpha$, terminate with the smooth-cylindrical end portions 35 of the reduced diameter portion of the support piston 5, which end portions 35 are adjacent to the ribbed portion above and below the latter. When the rolling bellows 3 is installed, the wall of the bellows, under the clamping force of the clamping ring 7, works into the spaces between the circumferential ribs 45, so that a positive clamping of the portion of the bellows placed upon the ribs results.

The present invention is, of course, in no way restricted to the specific disclosure of the specification and drawing, but also encompasses any modifications within the scope of the appended claims.

What I claim is:

1. A pneumatic shock absorber, especially for road vehicles, which includes a rolling bellows made of rubber, or rubber-like elastomeric synthetic material, containing reinforcing elements; said rolling bellows having two oppositely disposed end portions which are respectively mounted by means of clamping rings on mounting regions of a first support element and a second support element respectively, with said second support element being in the form of a support piston; in the mounted state, said rolling bellows having a rolling fold associated with one of its end portions, said rolling fold being adapted to ride on a surface of said support piston;

said mounting region of said support piston being in the form of a substantially cylindrical, reduced diameter portion of the latter, with a flange-like end abutment surface for the associated clamping ring being provided between said reduced diameter portion and said surface of said support piston on which said rolling fold rides, with said end abutment surface extending substantially at right angles to said reduced diameter portion of said support piston; circumferential ribs provided on said reduced diameter portion, and disposed in diametrical planes; said circumferential ribs having angularly symmetrical cross-sectional shapes; the improvement in combination therewith wherein:

said circumferential ribs are provided in only one axial portion of said reduced diameter mounting region of said support piston;

said circumferential ribs being provided in a central zone of said reduced diameter mounting region, with said central zone being bounded on both sides by respective smooth-cylindrical zones.

* * * * *